(No Model.) 2 Sheets—Sheet 1.

C. H. GRAY.
TIRE FOR VEHICLE WHEELS.

No. 452,876. Patented May 26, 1891.

Attest:
Geo H Potts
J J Kennedy

Inventor:
Christian Hamilton Gray
by Philipp Phelps Hervey
Attys (No Model.) 2 Sheets—Sheet 2.
C. H. GRAY.
TIRE FOR VEHICLE WHEELS.
No. 452,876. Patented May 26, 1891.
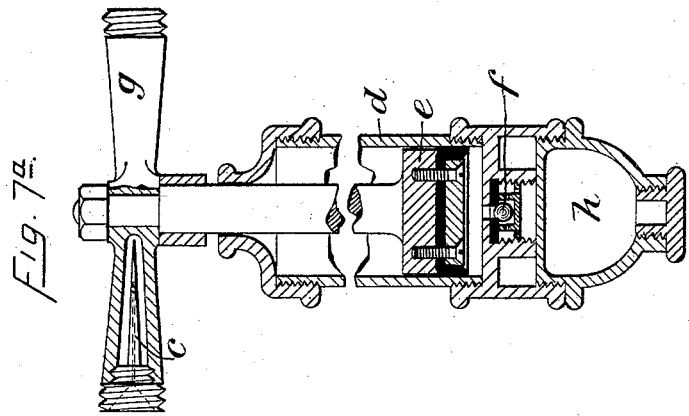
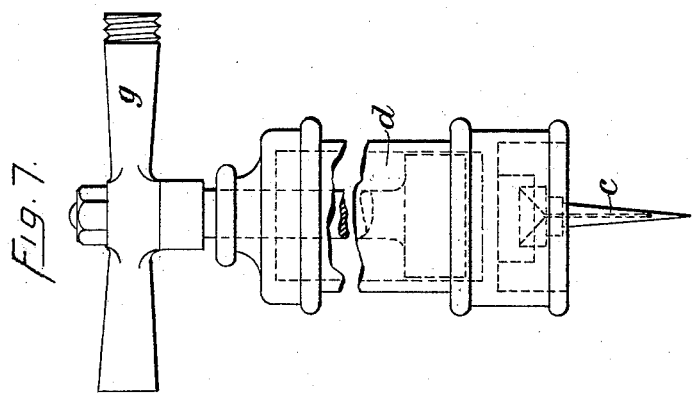
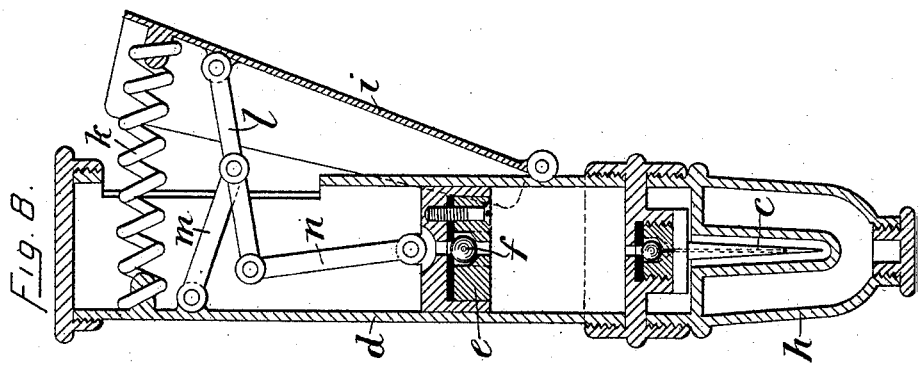
Attest:
Geo. H. Potts
J. J. Kennedy
Inventor:
Christian Hamilton Gray
by Philipp Phelps Huey
Attys

UNITED STATES PATENT OFFICE.

CHRISTIAN H. GRAY, OF SILVERTOWN, COUNTY OF ESSEX, ENGLAND.

TIRE FOR VEHICLE-WHEELS.

SPECIFICATION forming part of Letters Patent No. 452,876, dated May 26, 1891.

Application filed February 20, 1891. Serial No. 382,149. (No model.)

*To all whom it may concern:*

Be it known that I, CHRISTIAN HAMILTON GRAY, of Silvertown, in the county of Essex, England, have invented certain new and useful Improvements in the Manufacture of Air-Cushioned Tires for Velocipedes and other Wheeled Vehicles, of which the following is a specification.

This invention relates to a novel manufacture of tubular elastic tires for wheels, in which a cushion of air is imprisoned to maintain the form and elasticity of the tire. Tires of this class have hitherto presented some difficulties to the manufacturer, it having been usual to find an inlet for the air through the metal felly or grooved tire, and when the air is forced in to plug this opening. Tires of this kind when once pierced by accident or otherwise are liable to collapse or lose their efficiency, and it is then beyond the power of a rider during a journey to restore the efficiency of the tire.

To provide against the collapse of the tire or its loss of bearing-power when by accident or otherwise an opening is made in it through which the air will escape, I propose to impart to the hollow tire an adhesive property which will insure the closing automatically (or by the aid of external pressure) of the opening. This new property of the elastic tire provides for its reinflation by the rider and its restoration to efficiency without the aid of an expert.

In carrying out my invention I provide for the hollow tire a viscous lining of india-rubber, which lining, when the tire is submitted to the vulcanizing-heat, will not become vulcanized, but will retain its natural viscous or adhesive property, and while offering no obstruction to a needle-pointed air-injector will close up the pierced opening when the injector is withdrawn. Similarly if the tire is accidentally cut by a stone in the road the cut may be closed up by the natural tendency of the severed surfaces of the uncured rubber to adhere if grit or dirt is removed from the lips of the cut. The section of tire which I may adopt will vary according to the circumstances without affecting the nature of the invention.

In the accompanying drawings I have shown several varieties of section corresponding externally with those in common use; but it will be obvious that other varieties may be made to suit the different sections of fellies and channeled iron employed by manufacturers of velocipedes and other wheeled vehicles.

Figure 1 represents a tire of cylindrical section made according to this invention. $a$ is the external portion of the tire, made of vulcanized-india-rubber compound, and $b$ is the viscous lining, (that will not harden under the vulcanizing-heat,) composed, say, of pure plastic india-rubber or of rubber combined with linseed or hydrocarbon oil, and with or without the metallic or earthy ingredients usually employed in producing compound rubber.

Figure 1:
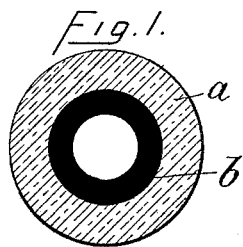
Figure 2:
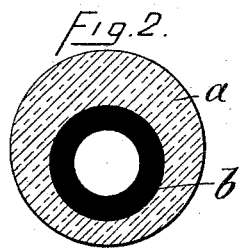
Fig. 2 represents a tire with the tubular lining $b$ placed eccentrically to the outer tube, thus giving an increased thickness of tread to the tire without increasing the weight of the material used.
Figure 3:
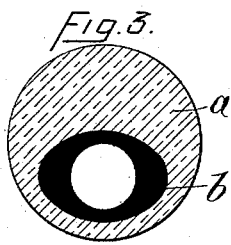
Fig. 3 represents the section of a tire with the lining-tube of an oval shape externally, its circular bore being eccentric to the outer tube $a$.
Figure 4:
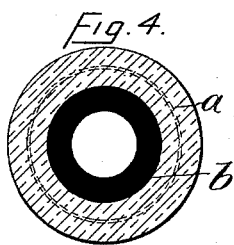
Fig. 4 shows a similar section of tire to that represented in Fig. 1, the part $a$ including laps of canvas (as employed in the well-known manufacture of hose-pipes) for stiffening the tires.
Figure 5:
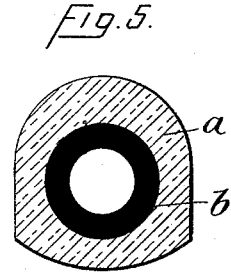
Figure 6:
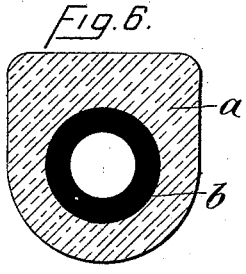

Figs. 5 and 6 show sections of lined tires which may be used when flat treads are required. The lining-tube $b$, whether composed of pure india-rubber or rubber compound, with or without a slight admixture of sulphur, I make either by hand from sheet-rubber or by squeezing out the plastic material through a die in the well-known manner. The tube thus constructed constitutes a hollow core, upon which the outer tube $a$ is formed either by hand or by machinery, the core in the latter case being led through the molding-die. The lined tubing thus prepared I cut into lengths suitable for forming a tire and join up the ends in the usual way, inserting previously to joining up some material which vaporizes at a temperature below the vulcanizing-point in lieu of water, which is commonly employed for securing the internal pressure requisite for forcing the plastic material into close contact with the molding-surface during vulcanization.

The vaporizable material which I prefer to employ is either carbonate of ammonia or carbonate of magnesia, it being undesirable to employ water, as the presence of moisture within the tire militates against the adhesion of the pierced or severed parts of the viscous lining.

The joined-up tubing I place in a metallic mold and subject it to a vulcanizing-heat, which completes the manufacture of the tire.

Instead of lining the tire with a tubular core, as shown in the drawings, it may suffice to employ, instead of the cylindrical core in the manufacture of tire-tubing, a segment of a cylinder or a broad strip of the plastic rubber, placing it in a position to line the more exposed portion of the tire and to be pierced by the insertion of the point of the inflating-instrument, when the opening made by the piercing or cutting instrument will close on its withdrawal, as above explained. In this case the manufacture of the tire-tubing will be from sheets of the prepared rubber.

The inflating-instrument which I propose to provide for bicycle-riders is shown in side elevation at Fig. 7, and consists of a hollow steel piercer $c$, fitted to a cylinder $d$, of the ordinary syringe type. A piston $e$ (see the sectional view, Fig. 7ª) works in this cylinder, having a cup-leather which permits air to pass inward on the withdrawal of the piston, and forces the air, on the advance of the piston, past a ball-valve $f$ and into and through the hollow steel piercer. A lateral hole in the side of this piercer permits of the discharge of the compressed air. The piston is worked by a handle $g$, fitted to the piston-rod, and for the convenience of packing, this handle is made hollow to receive the piercer when not in use, as shown at Fig. 7ª. The cylinder, when not in use, is made to carry a small vessel $h$, Fig. 7ª, which contains india-rubber solution for repairing the injured tire.

For the purpose of giving greater compression to the air I may use the arrangement of air-pump shown at Fig. 8. In this example $i$ is a plate hinged to the side of the cylinder $d$ and pressed outward by a spring $k$. Pivoted to the inner face of this plate $i$ is a lever $l$, which passes through an opening in the side of the cylinder and there forms, with a lever $m$, pivoted to the inside of the cylinder, a toggle-joint, which will close and open by the movements of the plate $i$ on its hinge, caused by the grasping-pressure of the hand in working the air-pump and the counteraction of the spring $k$ on the relaxation of that pressure. This movement will, through the connection of the lever $l$ with the piston $e$, (through its connecting-link $n$,) operate the piston in its cylinder and facilitate the compression of air in and its ejection from the cylinder through the hollow piercer $c$. Thus with comparatively little exertion on the part of the bicycle-rider his injured tire may be reinflated when required without any material sacrifice of time in his journey.

Having now particularly described my invention, what I claim is—

An air-cushioned tire with a lining or partial lining of viscous or plastic rubber, which will provide for the closing up of holes made in the air-cell of the tire, as and for the purpose above set forth.

CHRISTIAN H. GRAY.

Witnesses:
H. K. WHITE,
H. F. C. GOLTZ.